US012633857B1

(12) United States Patent
Ma et al.

(10) Patent No.: US 12,633,857 B1
(45) Date of Patent: May 19, 2026

(54) METHOD, CONTROLLER AND MOTOR DRIVE SYSTEM FOR SUPPRESSING ELECTROMECHANICAL COUPLING RESONANCE

(71) Applicant: Southwest Jiaotong University, Chengdu City (CN)

(72) Inventors: Guangtong Ma, Chengdu City (CN); Shuai Xu, Chengdu City (CN); Guanzhou Ren, Chengdu City (CN); Chunxing Yao, Chengdu City (CN); Liang Chen, Chengdu City (CN); Hong Xie, Chengdu City (CN); Wencai Lyu, Chengdu City (CN)

(73) Assignee: Southwest Jiaotong University, Chengdu City (CN)

( * ) Notice: Subject to any disclaimer, the term of this patent is extended or adjusted under 35 U.S.C. 154(b) by 0 days.

(21) Appl. No.: 19/274,189

(22) Filed: Jul. 18, 2025

(30) Foreign Application Priority Data

Nov. 18, 2024 (CN) .......................... 202411639166.8

(51) Int. Cl.
H02P 23/00 (2016.01)
G05B 17/02 (2006.01)

(52) U.S. Cl.
CPC .......... H02P 23/0077 (2013.01); G05B 17/02 (2013.01)

(58) Field of Classification Search
CPC ........................... H02P 23/0077; G05B 17/02
See application file for complete search history.

(56) References Cited

U.S. PATENT DOCUMENTS

2021/0011454 A1* 1/2021 Kanke ................... G01L 5/0019
2023/0101356 A1* 3/2023 Araki .................... H02P 27/085
318/400.23

FOREIGN PATENT DOCUMENTS

CN 109039192 A 12/2018
CN 110784149 A 2/2020
(Continued)

OTHER PUBLICATIONS

The first office action of counterpart CN application No. 2024116391668 issued on Dec. 24, 2024.
(Continued)

*Primary Examiner* — Chad G Erdman
(74) *Attorney, Agent, or Firm* — The Sun IP Law

(57) ABSTRACT

The present disclosure discloses a method, a controller, and a motor drive system for suppressing electromechanical coupling resonance, relates to the technical field of electromechanical control. The present disclosure includes constructing a dynamic model of a mechanical system; constructing a control algorithm model of a control system: determining a mathematical model of a control object in the control system, including a mathematical model of a permanent magnet motor and an inverter, and designing a motor controller for the mathematical model; constructing an electromechanical coupling model based on the dynamic model of the mechanical system and the control algorithm model of the control system; and carrying out resonance characteristic analysis of an electromechanical system based on the electromechanical coupling model to determine resonance points. The method proposed in the present disclosure combines ADRC, ensuring good control performance when motor parameters change, and robustness against changes of PMSM parameters.

9 Claims, 7 Drawing Sheets
(4 of 7 Drawing Sheet(s) Filed in Color)

(56) References Cited

FOREIGN PATENT DOCUMENTS

| CN | 114977663 | A |   | 8/2022 |   |   |
|----|-----------|---|---|--------|---|---|
| CN | 115296586 | A |   | 11/2022 |   |   |
| CN | 116317752 | A |   | 6/2023 |   |   |
| CN | 117811448 | A | * | 4/2024 | .......... | H02P 23/0004 |

OTHER PUBLICATIONS

Notice of Grant of counterpart CN application No. 2024116391668 issued on Feb. 18, 2025.
Liang Weizheng, ADRC Controller Design of the Rolling Mill Main Drive Electromechanical System , China Academic Journal Electronic Publishing House.Dec. 31, 2021.

* cited by examiner

FIG. 1

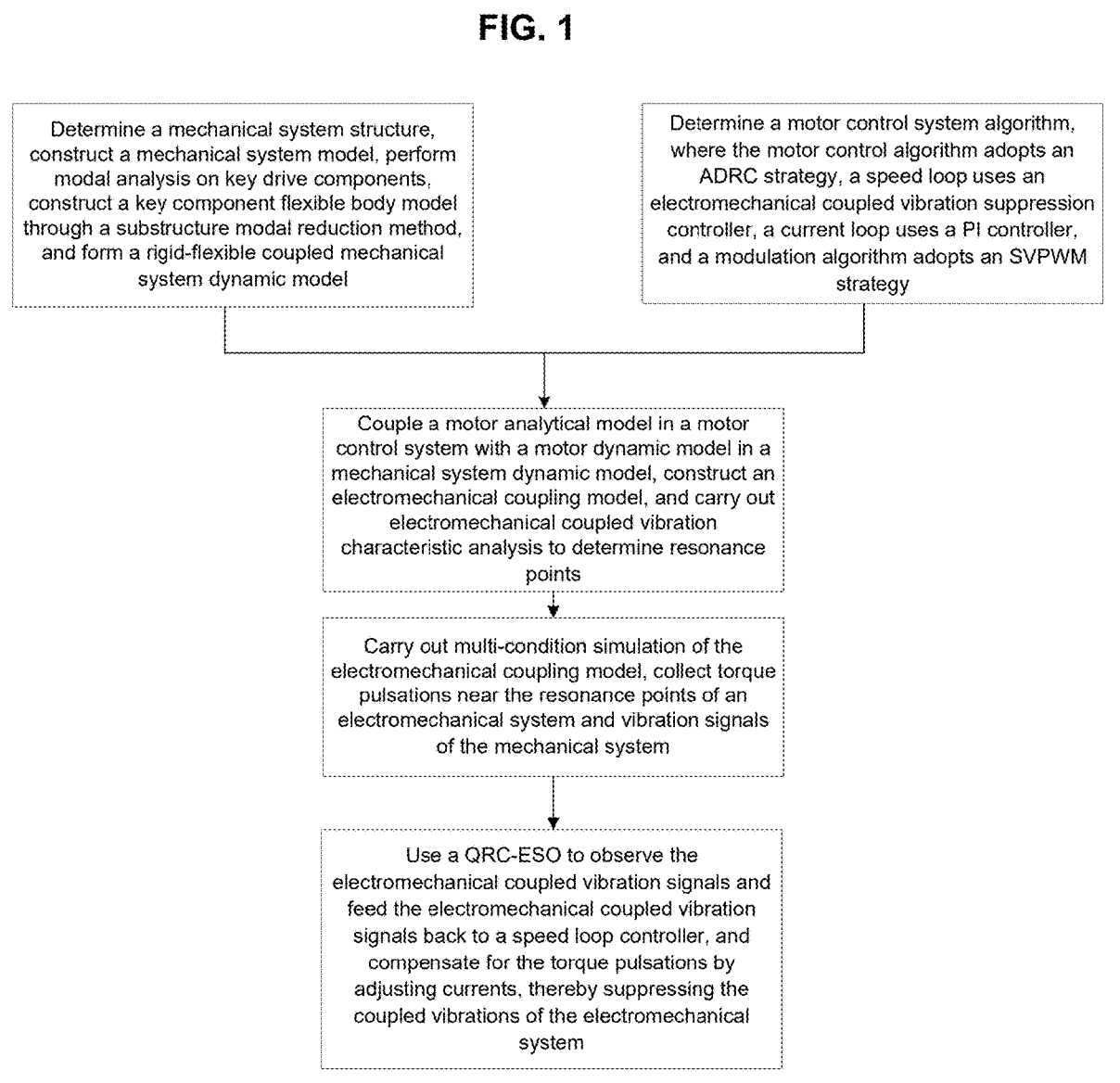

Determine a mechanical system structure, construct a mechanical system model, perform modal analysis on key drive components, construct a key component flexible body model through a substructure modal reduction method, and form a rigid-flexible coupled mechanical system dynamic model Determine a motor control system algorithm, where the motor control algorithm adopts an ADRC strategy, a speed loop uses an electromechanical coupled vibration suppression controller, a current loop uses a PI controller, and a modulation algorithm adopts an SVPWM strategy Couple a motor analytical model in a motor control system with a motor dynamic model in a mechanical system dynamic model, construct an electromechanical coupling model, and carry out electromechanical coupled vibration characteristic analysis to determine resonance points Carry out multi-condition simulation of the electromechanical coupling model, collect torque pulsations near the resonance points of an electromechanical system and vibration signals of the mechanical system Use a QRC-ESO to observe the electromechanical coupled vibration signals and feed the electromechanical coupled vibration signals back to a speed loop controller, and compensate for the torque pulsations by adjusting currents, thereby suppressing the coupled vibrations of the electromechanical system

METHOD, CONTROLLER AND MOTOR DRIVE SYSTEM FOR SUPPRESSING ELECTROMECHANICAL COUPLING RESONANCE

TECHNICAL FIELD

The present disclosure relates to the technical field of electromechanical control, and in an embodiment, to a method, a controller, and a motor drive system for suppressing electromechanical coupling resonance.

BACKGROUND

Electromechanical devices are widely used across various fields, and a problem of electromechanical coupling resonance within the electromechanical devices has gradually been discovered by people. The electromechanical coupling resonance refers to the resonance triggered when a current harmonic frequency generated by a control system in the electromechanical device coincides with a natural frequency of drive components in a mechanical system, which has a certain impact on the operational stability of a mechanical device and the life of components inside the device.

In particular, to enhance the efficiency of a rail vehicle, researchers have proposed a permanent magnet direct drive solution, which combines a direct drive system with a permanent magnet synchronous motor. However, a permanent magnet synchronous motor direct drive system is a nonlinear, high-order, and strongly coupled system. This characteristic amplifies the influence of electric torques and control performance on a drive system. In a permanent magnet direct drive system, a motor directly drives a load to achieve a rotational motion, which requires the generation of high torques at low velocities. Therefore, the frequency of a harmonic torque decreases with rotor velocities, and at certain velocities, is consistent with the modal frequency of a mechanical structure. The harmonic torque can lead to electromechanical coupling resonance, jeopardizing system stability and accelerating component failures. Therefore, it is urgent to adopt an effective method for suppressing electromechanical coupling resonance to ensure the safe and comfortable operation of trains.

In existing research methods, vibration suppression methods are categorized into a method based on a rail mechanical drive system and a method based on a motor control system. The method based on the rail mechanical drive system primarily focuses on dynamic responses and vibration levels induced by random vibrations. The motor is suspended through a rubber joint, which prevents most of the harmonic torque of the traction motor from being transmitted to a bogie frame or vehicle body. Additionally, electrical torque is often considered a constant value, neglecting the impact of the harmonic torque, and thus cannot effectively suppress the electromechanical coupling resonance.

The method based on the motor control system suppresses resonance by suppressing periodic disturbances. Numerous optimal control algorithms have been proposed, including resonance control, repetitive control, adaptive control, and active disturbance rejection control (ADRC). However, these methods do not analyze the electromechanical coupling resonance problem, are relatively complex to implement, and yield unsatisfactory results.

SUMMARY

In order to solve the above-mentioned problems existing in the prior art, the present disclosure provides a method, a controller, and a motor drive system for suppressing electromechanical coupling resonance, to solve the problems of influencing system stability and accelerating component failures due to electromechanical coupling resonance in a direct-drive system.

A controller for suppressing electromechanical coupling resonance includes an Extended State Observer (ESO) integrated with a Quasi-Resonant Controller (QRC), (QRC-ESO). A state-space equation of the QRC-ESO is as follows:

$$
\begin{bmatrix} \dot{z}_1 \\ \dot{z}_2 \end{bmatrix} = \begin{bmatrix} 0 & 1 \\ 0 & 0 \end{bmatrix} \begin{bmatrix} z_1 \\ z_2 \end{bmatrix} + \begin{bmatrix} b_0 \\ 0 \end{bmatrix} u + \begin{bmatrix} \beta_1 \\ \beta_2(1 + G_{QRC}) \end{bmatrix} (x_1 - z_1),
$$

In the state-space equation, $z_1$ denotes an estimated mechanical angular velocity, $z_2$ denotes an estimated lumped disturbance, $b_0 = 1/J_0$, $J_0$ denotes a nominal inertia value, $x_1 = \omega_m$, $\omega_m$ denotes a mechanical angular velocity, $x_2 = d_n$, $d_n$ denotes a lumped disturbance, $u = i_s$, $i_s$ denotes a stator current, and $\beta_1$ and $\beta_2$ are gains of an estimation loop. $G_{QRC}$ is the representation of QRC, which is as follows:

$$
G_{QRC}(s) = \frac{2K_r w_c s}{s^2 + 2w_c s + w_r^2},
$$

in the formula, $\omega_c$ denotes a cutoff frequency of the QRC controller, $\omega_r$ denotes a resonant frequency of a controlled object, and $K_r$ denotes a gain coefficient of the QRC controller.

An error state-space equation of the QRC-ESO is:

$$
\begin{bmatrix} \dot{e}_1 \\ \dot{e}_2 \end{bmatrix} = \begin{bmatrix} \beta_1 & 1 \\ \beta_2(1 - G_{QRC}) & 0 \end{bmatrix} \begin{bmatrix} e_1 \\ e_2 \end{bmatrix} + \begin{bmatrix} 0 \\ -1 \end{bmatrix} \dot{d}_n,
$$

in the error state-space equation, $e_1$ denotes an angular velocity estimation error, $e_1 = z_1 - \omega_m$, $e_2$ denotes a disturbance estimation error, and $e_2 = z_2 - d_n$.

A transfer function between the angular velocity estimation error $e_1$ and a system disturbance $x_2$ in the QRC-ESO is:

$$
G_{e1}^{QRC-ESO}(s) = \frac{e_1}{x_2} = \frac{s}{s^2 + \beta_1 s + \delta(s)},
$$

in the formula, $\delta(s) = \beta 2(1 + QRC(s))$; and a transfer function between a disturbance estimation $z_2$ and the system disturbance $x_2$ in the QRC-ESO is:

$$
G_{z2}^{QRC-ESO}(s) = \frac{z_2}{x_2} = \frac{\delta(s)}{s^2 + \beta_1 s + \delta(s)}.
$$

Further, the cutoff frequency of the QRC controller is 10 Hz to 25 Hz near the resonant frequency, and the gain coefficient of the QRC controller is 0.0001 to 0.001.

Further, Resonance Suppression-Active Disturbance Rejection (RS-ADRC) is included, and adopts the QRC-ESO as an extended state observer, and an open-loop transfer function of the RS-ADRC is:

$$
C_0(s) = \frac{\left[ (2K_s w_0 + w_0^2)s + K_s w_0^2 \right] \Delta(s) + K_r w_c (s^2 + K_s s)}{\left[ s^3 + (2w_0 + K_s)s^2 \right] \Delta(s)},
$$

in the open-loop transfer function, $\omega_c$ denotes the cutoff frequency of a QRC controller, $\omega_r$ denotes a resonant frequency of a controlled object, $K_r$ denotes a gain coefficient of the QRC controller, $\omega_0$ denotes a bandwidth of a sensor, and $K_s$ denotes a velocity loop gain parameter; and $$\Delta(s) = s^2 + 2w_c s + w_r^2.$$

A method for suppressing electromechanical coupling resonance includes:

determining a mechanical system structure of an electromechanical device and a control system algorithm of the electromechanical device, and constructing a dynamic model of a mechanical system and a control algorithm model of a control system, in an embodiment, the electromechanical device includes a permanent magnet direct drive traction system, such as a permanent magnet direct drive train, a rotorcraft, and a wind turbine in a wind power plant;

constructing an electromechanical coupling model based on the dynamic model of the mechanical system and the control algorithm model of the control system: exchanging information between the dynamic model and a motor control model, the control algorithm model taking rotational velocity of a motor rotor and load signals of the motor rotor in the dynamic model as input signals for processing via a controller to output a motor control signal, the motor control signal driving an inverter to adjust a motor rotational velocity and a output drive torque, and the dynamic model calculating a dynamic response characteristic of the dynamic model based on a driving torque of a motor and a load torque of the motor; and carrying out resonance characteristic analysis of an electromechanical system based on the electromechanical coupling model to determine resonance points: conducting modal analysis for the dynamic model of the mechanical system to obtain natural modal frequency information of drive components; analyzing a harmonic characteristic of a stator current and a harmonic characteristic of an output torque in the control algorithm to obtain a frequency distribution characteristic of a harmonic current and a frequency distribution characteristic of a harmonic torque, and performing comparative analysis on a mechanical modal frequency characteristic with a harmonic torque characteristic to determine a frequency distribution range of coupled vibrations of the electromechanical system and obtain the resonance points.

In an embodiment, constructing the dynamic model of the mechanical system includes: determining components of the mechanical system, modeling drive components involved in drive as flexible bodies, to reflect a natural mechanical modal characteristic and a characteristic frequency, treating remaining components as rigid bodies to establish a finite element model of the mechanical system;

discretizing the finite element model; by using a substructure modal reduction method, reducing a degree of freedom of the finite element model to create the flexible bodies and ensure that each component can transmit high-frequency vibrations.

A process of constructing the control algorithm model of the control system includes: determining a mathematical model of a control object in the control system, including a mathematical model of a permanent magnet motor and an inverter, and designing a motor controller for the mathematical model, wherein the motor controller includes an Active Disturbance Rejection (ADRC) rotational velocity loop controller, a dq-axis current controller, and a Pulse Width Modulation (PWM) algorithm.

In an embodiment, the method further includes: designing a coupled vibration suppression algorithm for the resonance points. Since a resonance source in the electromechanical system is the motor harmonic torque, it is necessary to design an observer for a coupled vibration state of the electromechanical system. To observe harmonic torques and rotational velocity fluctuations within a frequency range and output suppression signals, thereby reducing amplitude of the harmonic torques near the resonant frequency and the impact of harmonic torques on mechanical system vibrations.

In an embodiment, when the electromechanical device is a permanent magnet direct drive train, the step of constructing a dynamic model of a mechanical system includes: constructing a dynamic model of the entire train, and modeling a direct drive bogie dynamic model. The step of constructing a control algorithm model of a control system includes constructing a full-velocity-range control algorithm model for a permanent magnet direct drive motor. The step of constructing an electromechanical coupling model includes: using an electromagnetic torque and a rotor rotational velocity as key parameters for electromechanical coupling of the permanent magnet direct drive system; building an electromechanical coupling dynamic numerical simulation platform based on the joint simulation of the dynamic model and the control algorithm model, and based on that, carrying out modal analysis of the entire train electromechanical system to study features of electromechanical coupling resonance and corresponding coupled vibration suppression algorithms.

In an embodiment, the mechanical system includes: a vehicle body, a bogie frame, permanent magnet direct drive traction systems, an inboard axle box, and wheelsets. All components except the permanent magnet direct drive traction systems may be regarded as rigid bodies. Each wheelset is driven by one permanent magnet direct drive traction system, and each permanent magnet direct drive traction system is composed of a permanent magnet direct drive traction motor, a flexible-plate hollow-shaft coupling, and a motor hanger.

The step of constructing a dynamic model of the entire train includes: transmitting a load on the frame to the wheelsets through a primary suspension, connecting the vehicle body to the frame through a secondary suspension; and treating the primary suspension and the secondary suspension as spring-damper units; fixing a permanent direct drive motor stator to the motor hanger, and connecting the motor hanger with the frame by a suspension rod and a cantilever, wherein suspension points of the suspension rod at two ends of the motor primarily provide vertical force, while the cantilever can be regarded as a longitudinal and vertical spring-damper unit; and taking axle box pull rods between the wheelsets and the frame, as well as traction rods between the bogie and the vehicle body equivalent to shock absorbers, and transmitting traction force of the bogie to the vehicle body through the traction rods.

A creep force model is adopted for wheel-rail contact, and Hertzian nonlinear contact is selected in a normal direction.

The step of modeling a direct drive bogie dynamic model includes: connecting a force-transmitting flange at one end of the hollow shaft coupling to an output end of the motor rotor by a flexible plate, the flexible plate is regarded as a spring-damper unit in longitudinal, vertical, and torsional directions;

connecting the other end of the hollow shaft coupling to a force-transmitting disk by the flexible plate; assembling the force-transmitting disk and an axle through interference fit, the flexible plate between the hollow shaft and the force-transmitting disk is equivalent to a spring-damper unit in the longitudinal, vertical, and torsional directions; and fixedly connecting the force-transmitting disk in the coupling and the axle, which synchronously rotate around a Y-axis of a coordinate system.

An axle box body is fixed to the axle through bearings, with only a degree of freedom for rotation around the Y-axis released between the axle box and the axle. The motor rotor is fixed to a stator housing through bearings at two ends, with only the degree of freedom for rotation around the Y-axis released between the rotor and the stator.

In an embodiment, an electromechanical coupling principle of the electromechanical coupling dynamic numerical simulation platform is as follows: the electromechanical coupling dynamic numerical simulation platform calculates a real-time rotational velocity of the motor rotor in the dynamic model based on a traction torque and a load torque, and inputs the real-time rotational velocity into the control algorithm model, and the control algorithm model adjusts the electromagnetic torque output by the motor based on a difference between an actual rotational velocity and a reference rotational velocity, to achieve operational control of the train;

wherein coupled parameters of the dynamic model influence the rotational velocity of the motor rotor, the rotational velocity, as an input to a traction motor control system, in turn influences the electromagnetic torque output by the motor, the electromagnetic torque and the harmonic torque affect the dynamic response of a train mechanical structure, to implement a coupling effect between the mechanical system and the control system, and the coupled parameters include a rail spectrum, suspension components, and structural elastic vibrations.

A motor drive system for suppressing electromechanical coupling resonance adopts an electromechanical coupling resonance suppression controller. The controller is arranged in a control system, and the control system is connected with a mechanical system.

In an embodiment, the control system includes a velocity loop controller, a field-weakening control module, a current loop Proportional-Integral (PI) controller, a Space Vector Modulation (SVM) module, and an inverter module. The velocity loop controller adopts Resonance Suppression-Active Disturbance Rejection (RS-ADRC). A control principle of the control system is as follows:

when the rotational velocity of the motor is low, the required reference voltage $u_{s,ref}$ is within an inverter voltage output range. In this case, the field-weakening control module is inactive, and a dq-axis reference current is determined by a Maximum Torque Per Ampere (MTPA) module.

As the rotational velocity gradually increases, the required reference voltage $u_{s,ref}$ gradually exceeds the inverter voltage output range. In this case, the field-weakening control module is enabled, and the dq-axis reference current is determined by the field-weakening control module. A d-axis current increases in a negative direction to weaken a motor back electromotive force amplitude and broaden a motor operating velocity range.

The current loop PI controller adjusts a dq-axis reference voltage based on the dq-axis reference current and inputs the dq-axis reference voltage into the SVM modulation module.

The SVM modulation module processes and outputs an inverter switching signal to control an on-off time and a sequence of the inverter module. This, in turn, controls a three-phase winding current of the permanent magnet direct drive motor, thereby achieving the goal of adjusting the rotational velocity and the torque of the motor.

The present disclosure has the beneficial effects:

1. For the existing problem about the electromechanical coupling resonance, in the present disclosure, the electromechanical coupling model is constructed based on the dynamic model of the mechanical system and the control algorithm model of the control system; the resonance characteristic analysis of the electromechanical system is carried out based on the electromechanical coupling model to determine the resonance points for a quick and accurate understanding of the resonance points, thereby performing a resonance suppression algorithm design for the resonance points, to solve the problem about the electromechanical coupling resonance; and based on a processing idea of the present disclosure, the problem about the electromechanical coupling resonance occurring to various types of complex electromechanical devices can be solved, which is of great significance for ensuring the system stability of the complex electromechanical devices and delaying component failures.

2. In the present disclosure, the permanent magnet direct drive train is also used as the electromechanical device. From the perspective of motor control, the capability of observing high-frequency signals can be enhanced by improving the observer. Then, the current is adjusted in real time based on a disturbance signal, without the need for mechanical structure modifications, resulting in low costs.

3. Based on the method proposed in the present disclosure, an appropriate cutoff frequency $\omega_c$ and an appropriate resonant gain coefficient $K_r$ are selected for the observer. The cutoff frequency is within a range approximately 10 Hz to 25 Hz around the resonant frequency, and characteristic components near the resonant frequency should be included as much as possible. The resonant gain coefficient is set to range from 0.0001 to 0.001. It should be ensured that while high-frequency signals of coupled vibrations are amplified, additional noise signals are not amplified, thereby enhancing the operational performance of the motor without introducing extra interference.

4. The method proposed in the present disclosure combines the ADRC, ensuring good control performance when motor parameters change, and robustness against changes of Permanent Magnet Synchronous Motor (PMSM) parameters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a flowchart of a method for suppressing electromechanical coupling resonance according to an embodiment of the present disclosure.

7 ing to an embodiment of the present disclosure and the prior art in suppressing electromechanical coupled vibrations.

Figure 3:
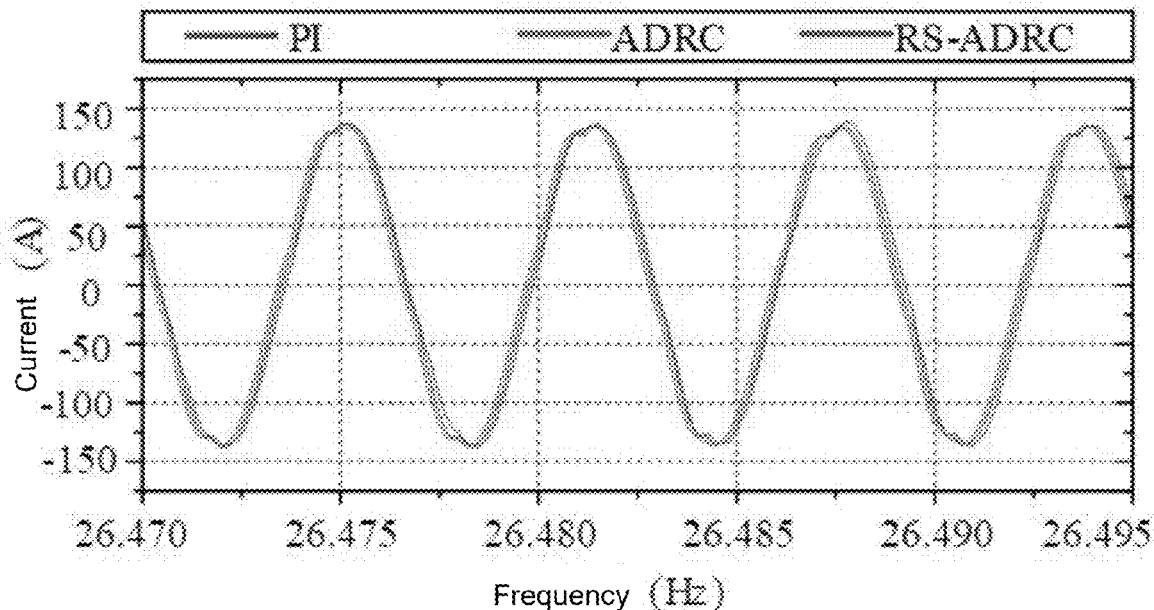

FIG. 3 illustrates currents when controlled by a controller for suppressing electromechanical coupling resonance according to an embodiment of the present disclosure and by the prior art respectively.

Figure 4:
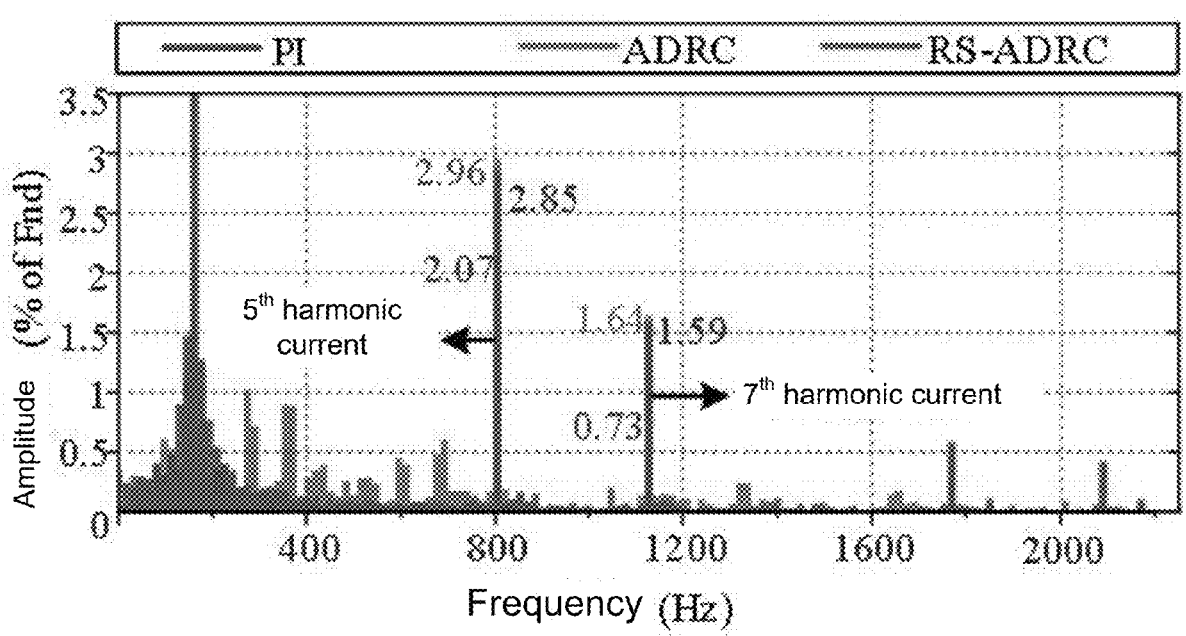

FIG. 4 illustrates Fast Fourier Transform (FFT) analysis corresponding to currents when controlled by a controller for suppressing electromechanical coupling resonance according to an embodiment of the present disclosure and by the prior art respectively.

Figure 5:
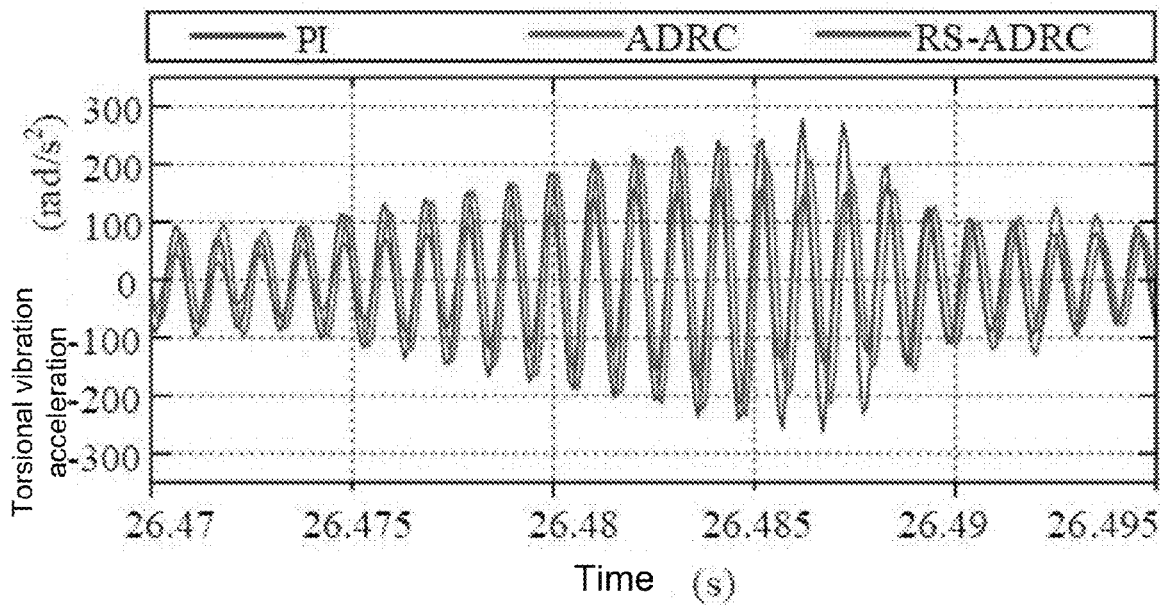

FIG. 5 illustrates peak values of torsional vibration acceleration in a direct drive system when controlled by a controller for suppressing electromechanical coupling resonance according to an embodiment of the present disclosure and by the prior art respectively.

Figure 6:
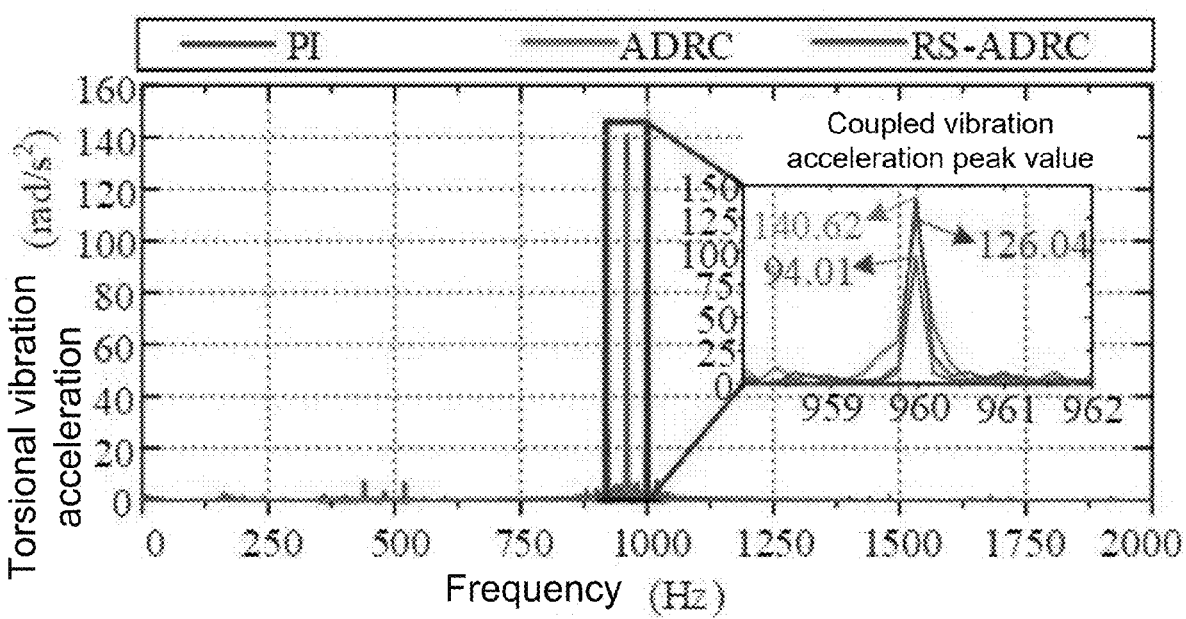

FIG. 6 illustrates FFT analysis corresponding to peak values of torsional vibration acceleration in a direct drive system when controlled by a controller for suppressing electromechanical coupling resonance according to an embodiment of the present disclosure and by the prior art respectively.

Figure 7:
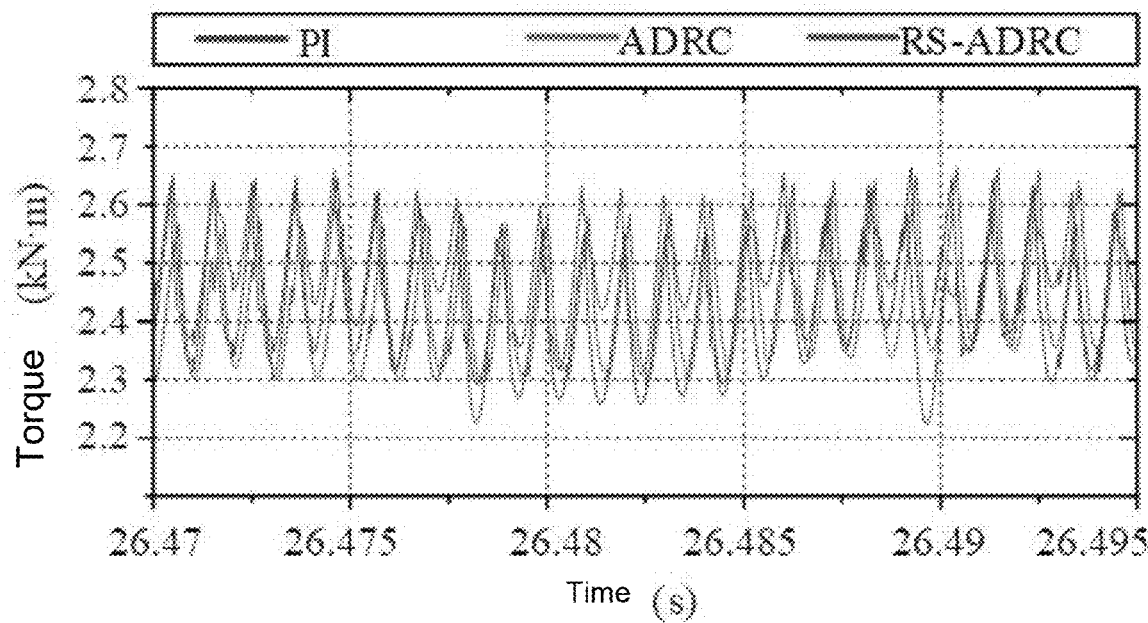

FIG. 7 illustrates torques when controlled by a controller for suppressing electromechanical coupling resonance according to an embodiment of the present disclosure and by the prior art respectively.

Figure 8:
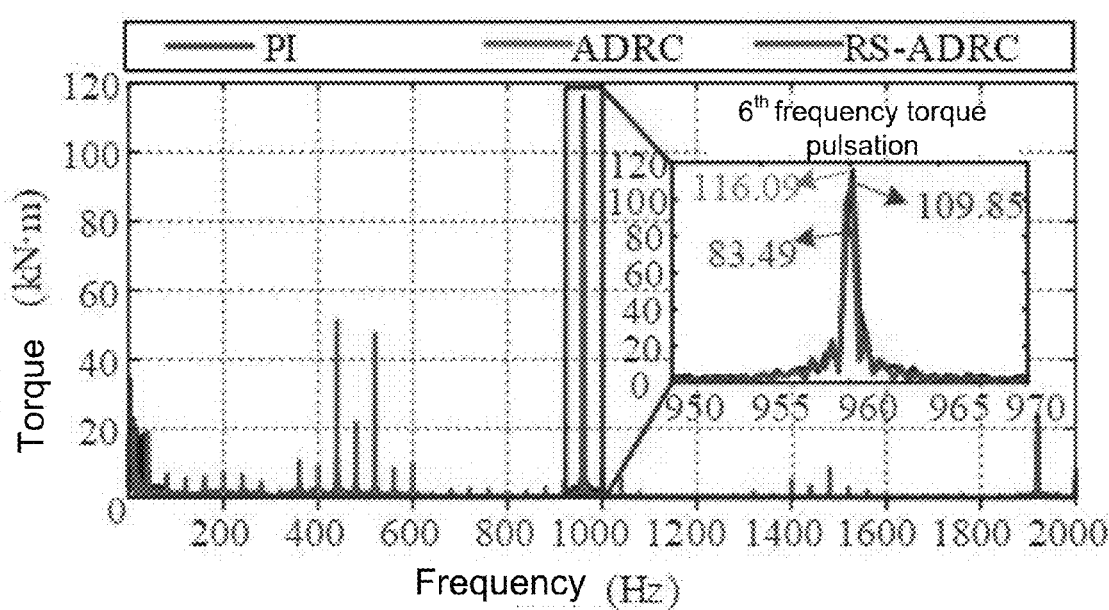

FIG. 8 illustrates FFT analysis corresponding to torques when controlled by a controller for suppressing electromechanical coupling resonance according to an embodiment of the present disclosure and by the prior art respectively.

Figure 9:
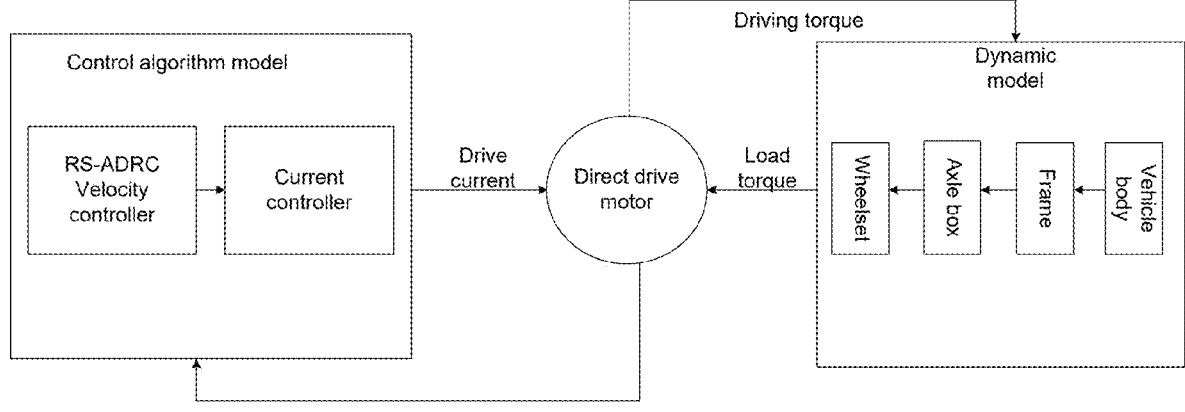

FIG. 9 is a schematic structural diagram of a motor drive system for suppressing electromechanical coupling resonance according to an embodiment of the present disclosure.

Figure 10:
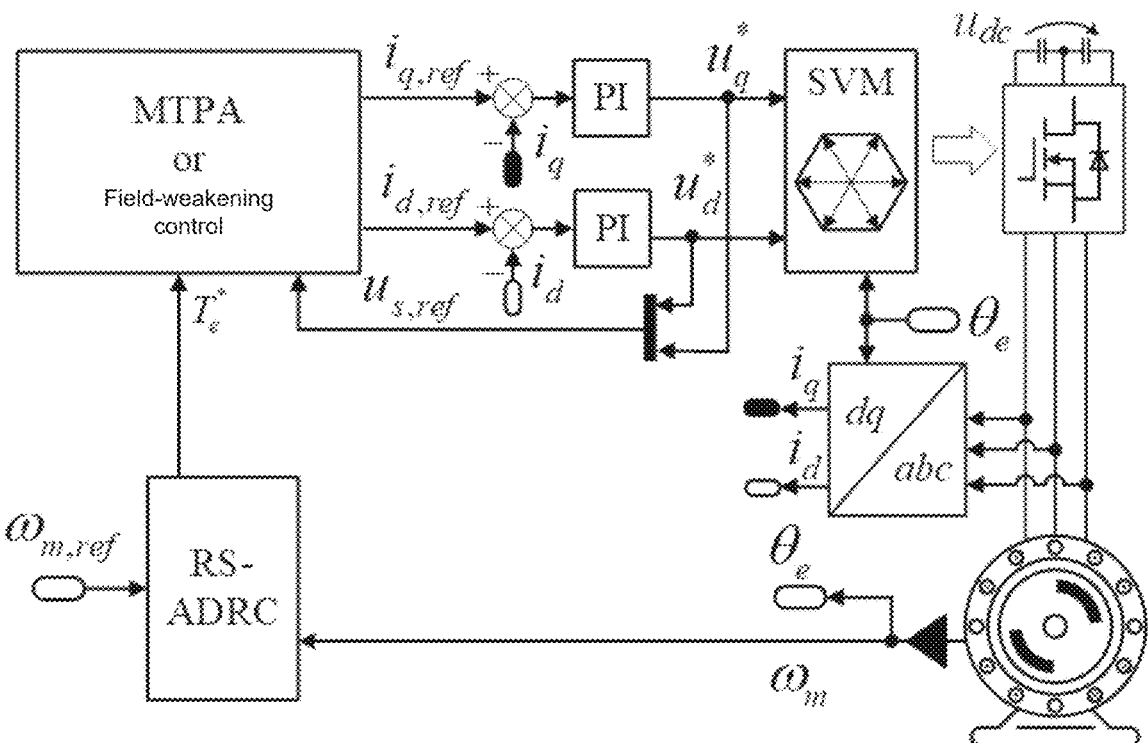

FIG. 10 is a schematic structural diagram of a control system in a motor drive system for suppressing electromechanical coupling resonance according to an embodiment of the present disclosure.

Figure 11:
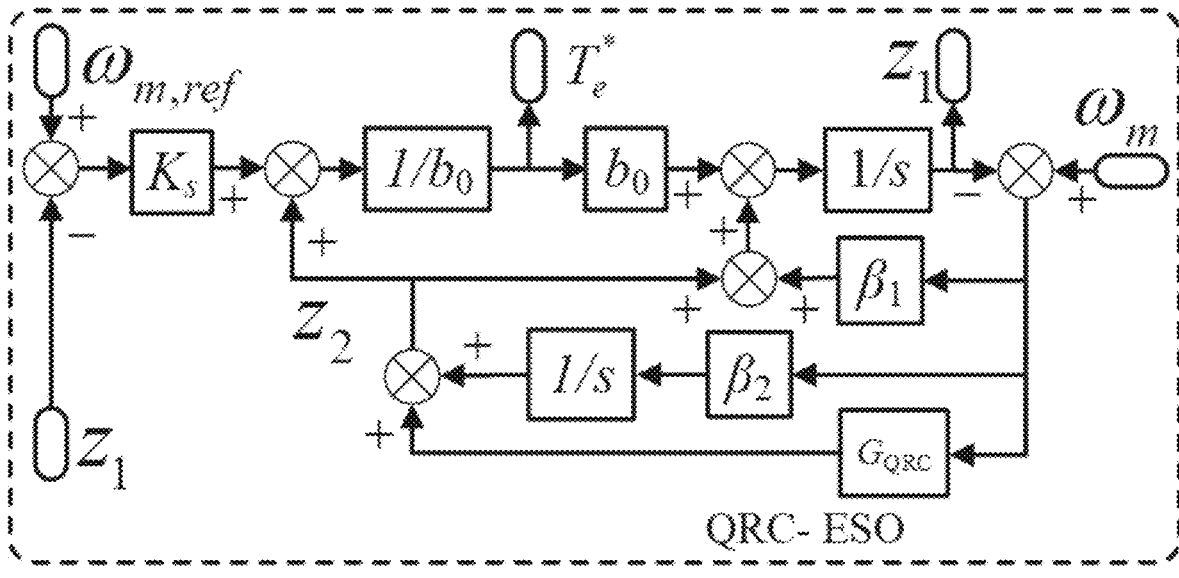

FIG. 11 is a schematic structural diagram of a RS-ADRC in a motor drive system for suppressing electromechanical coupling resonance according to an embodiment of the present disclosure.

Figure 12:
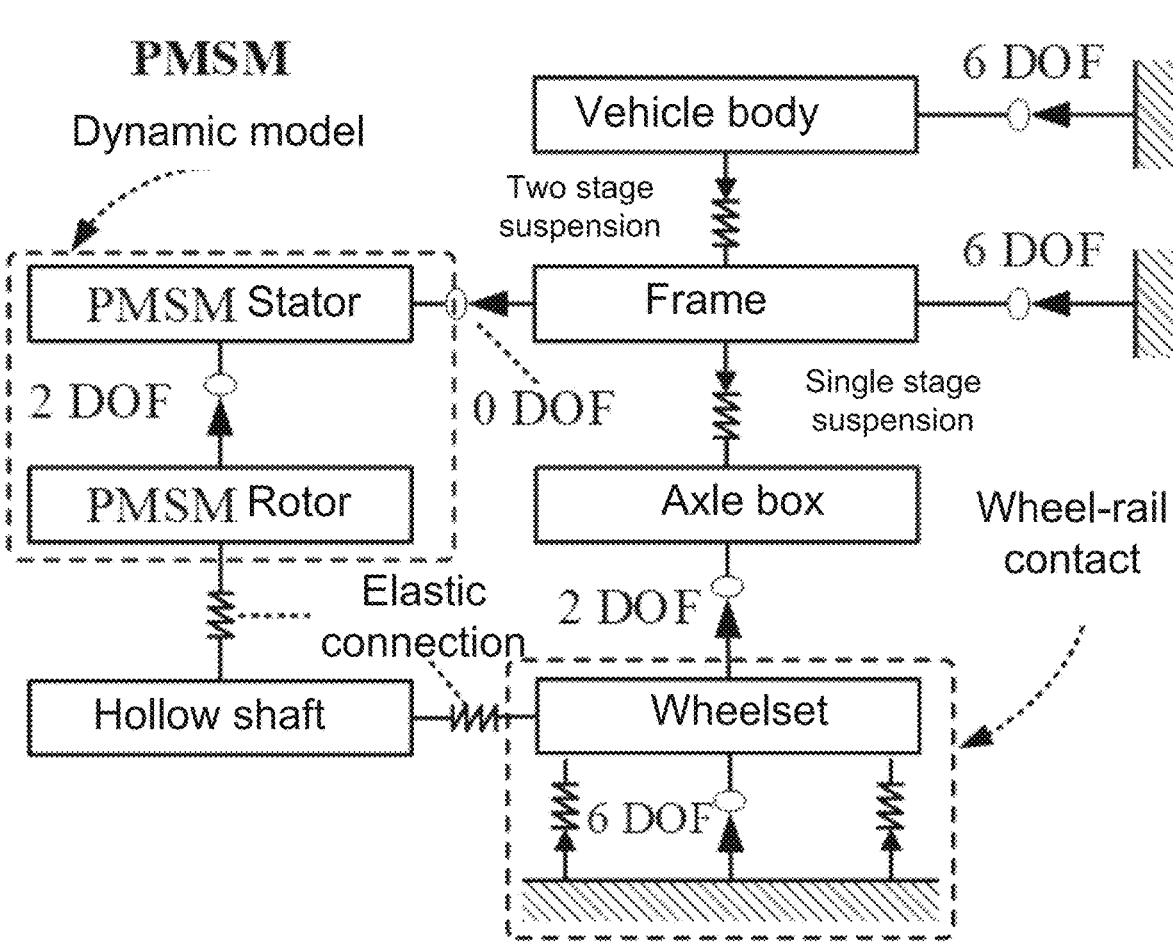

FIG. 12 is a schematic structural diagram of a mechanical system in a motor drive system for suppressing electromechanical coupling resonance according to an embodiment of the present disclosure.

DETAILED DESCRIPTION OF THE EMBODIMENTS

To make objectives, solutions, and advantages of embodiments of the present disclosure more clear, the solutions in the embodiments of the present disclosure are clearly and completely described in conjunction with the accompanying drawings in the embodiments of the present disclosure as below, and it is apparent that the described embodiments are only a part rather all of embodiments of the present disclosure. Therefore, the following detailed description of the embodiments of the present disclosure provided in the accompanying drawings is not intended to limit the scope of the present disclosure required to be protected, but only represents the selected embodiments of the present disclosure. Based on the embodiments of the present disclosure, all other embodiments obtained by those of ordinary skill in art without creative work shall fall within the scope of protection of the present disclosure.

A controller for suppressing electromechanical coupling resonance includes an Extended State Observer (ESO) integrated with a Quasi-Resonant Controller (QRC), (QRC-ESO). A state-space equation of the QRC-ESO is as follows:

$$\begin{bmatrix} \dot{z}_1 \\ \dot{z}_2 \end{bmatrix} = \begin{bmatrix} 0 & 1 \\ 0 & 0 \end{bmatrix} \begin{bmatrix} z_1 \\ z_2 \end{bmatrix} + \begin{bmatrix} b_0 \\ 0 \end{bmatrix} u + \begin{bmatrix} \beta_1 \\ \beta_2(1 + G_{QRC}) \end{bmatrix} (x_1 - z_1),$$

in the state-space equation, $z_1$ denotes an estimated mechanical angular velocity, $z_2$ denotes an estimated lumped disturbance, $b_0 = 1/J_0$, $J_0$ denotes a nominal inertia value, $x_1 = \omega_m$, $\omega_m$ denotes a mechanical angular velocity, $x_2 = d_n$, $d_n$ denotes a lumped disturbance, $u = i_s$, $i_s$ denotes a stator current, and $\beta_1$ and $\beta_2$ are gains of an estimation loop. $G_{QRC}$ is the representation of QRC, which is as follows:

$$G_{QRC}(s) = \frac{2K_r w_c s}{s^2 + 2w_c s + w_r^2},$$

in the formula, $\omega_c$ denotes a cutoff frequency of the QRC controller, $\omega_r$ denotes a resonant frequency of a controlled object, and $K_r$ denotes a gain coefficient of the QRC controller.

An error state-space equation of the QRC-ESO is:

$$\begin{bmatrix} \dot{e}_1 \\ \dot{e}_2 \end{bmatrix} = \begin{bmatrix} \beta_1 & 1 \\ \beta_2(1 + G_{QRC}) & 0 \end{bmatrix} \begin{bmatrix} e_1 \\ e_2 \end{bmatrix} + \begin{bmatrix} 0 \\ -1 \end{bmatrix} \dot{d}_n,$$

in the error state-space equation, $e_1$ denotes an angular velocity estimation error, $e_1 = z_1 - \omega_m$, $e_2$ denotes a disturbance estimation error, and $e_2 = z_2 - d_n$.

A transfer function between the angular velocity estimation error $e_1$ and a system disturbance $x_2$ in the QRC-ESO is:

$$G_{e1}^{QRC-ESO}(s) = \frac{e_1}{x_2} = \frac{s}{s^2 + \beta_1 s + \delta(s)},$$

in the formula, $\delta(s) = \beta_2(1 + G_{QRC}(s))$; and a transfer function between a disturbance estimation $z_2$ and the system disturbance $x_2$ in the QRC-ESO is:

$$G_{z2}^{QRC-ESO}(s) = \frac{z_2}{x_2} = \frac{\delta(s)}{s^2 + \beta_1 s + \delta(s)}.$$

In another embodiment, an appropriate cutoff frequency $\omega_c$ and an appropriate resonant gain coefficient $K_r$ are selected for the QRC-ESO. The cutoff frequency is within a range approximately 10 Hz to 25 Hz around the resonant frequency, and characteristic components near the resonant frequency should be included as much as possible. The resonant gain coefficient is set to range from 0.0001 to 0.001. It should be ensured that while high-frequency signals of coupled vibrations are amplified, additional noise signals are not amplified, thereby enhancing the operational performance of the motor without introducing extra disturbance.

In another embodiment, a controller for suppressing electromechanical coupling resonance includes RS-ADRC, and the RS-ADRC adopts a QRC-ESO as an extended state observer. An open-loop transfer function of the RS-ADRC is:

$$C_0(s) = \frac{\left[(2K_sw_0 + w_0^2)s + K_sw_0^2\right]\Delta(s) + K_rw_c(s^2 + K_ss)}{\left[s^3 + (2w_0 + K_s)s^2\right]\Delta(s)},$$

in the open-loop transfer function, $\omega_c$ denotes the cutoff frequency of a QRC controller, $\omega_r$ denotes a resonant frequency of a controlled object, $K_r$ denotes a gain coefficient of the QRC controller, $\omega_0$ denotes a bandwidth of a sensor, and $K_s$ denotes a velocity loop gain parameter.

Figure 2:
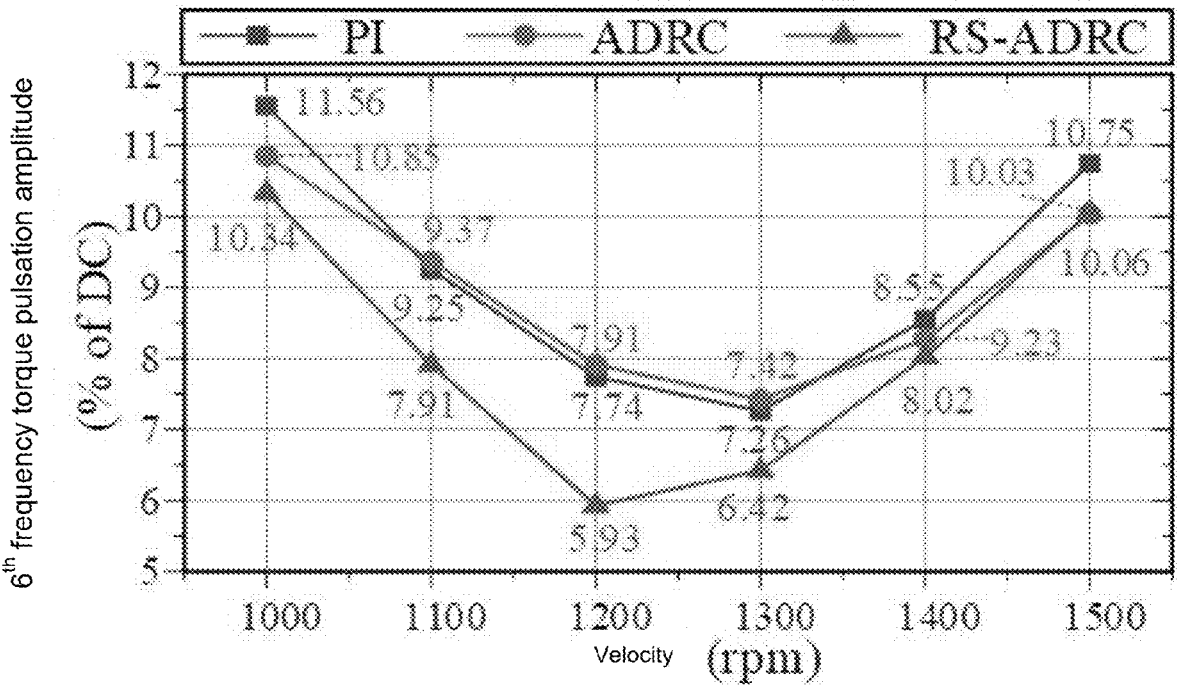
FIG. 2 is a comparison graph of effects of a controller for suppressing electromechanical coupling resonance accord-

During implementation, the structure is as shown in FIG. 11 (in the FIG. 11, $w_{m,ref}$ denotes a motor reference rotational velocity, $w_m$ denotes an actual rotational velocity, $K_s$ denotes a velocity loop gain, and $T_e^*$ denotes a reference torque), and in this embodiment, to verify a harmonic torque suppression capability of a proposed RS-ADRC control algorithm, comparative experiments are performed from 1000 rpm to 1500 rpm, as shown in FIG. 2. Comparison results indicate that a Proportional Integral (PI) controller and an active disturbance rejection controller have similar magnitudes of the 6$^{th}$ harmonic torque. A resonant frequency parameter $\omega_r$ of the QRC-ESO is set to 240 hz, which corresponds to a 6$^{th}$ harmonic torque frequency at 1200 rpm. It can be observed from the FIG. 2 that the RS-ADRC can significantly suppress the harmonic torque amplitude by at least 5.93% at 1200 rpm. Since the QRC-ESO also suppresses torque pulsations near the resonant frequency $\omega_r$, within the velocity range of 1000 rpm to 1500 rpm, the RS-ADRC exhibits the lowest 6$^{th}$ harmonic torque among the three methods, thereby effectively suppressing an excitation source of electromechanical coupled vibrations.

FIG. 3 to FIG. 8 illustrate comparisons of a controller control method proposed in the present disclosure with the prior art in various aspects, as detailed below:

FIG. 3 illustrates current waveforms through the three methods. FIG. 4 illustrates a diagram of a current frequency-domain analysis. From FIG. 4, it can be seen that the proposed method yields the lowest 5$^{th}$ and 7$^{th}$ current harmonics, resulting in the lowest 6$^{th}$ harmonic torque.

FIG. 5 illustrates time-domain waveforms of vibration acceleration through the three methods.

FIG. 6 illustrates frequency-domain waveforms of the vibration acceleration. From the FIG. 6, it can be seen that the proposed method achieves the lowest vibration acceleration amplitude, with a reduction of 33% compared to the PI method.

FIG. 7 illustrates torque waveforms through the three methods. FIG. 8 illustrates a frequency-domain diagram of oscillating torque waveforms. From the FIG. 8, it can be seen that the proposed method yields the lowest torque pulsation amplitude at the 6$^{th}$ harmonic frequency, achieving a reduction of 25% compared to the PI method.

In this embodiment, for the permanent magnet direct drive system, the motor torque pulsations within the commonly used velocity range can induce coupled vibrations in a hollow shaft coupling. To ensure the reliability and safety of the system operation, it is necessary to design a coupled vibration suppression algorithm for the permanent magnet direct drive system according to the electromechanical coupling resonance characteristic. The risk of the electromechanical coupled vibrations is reduced by suppressing the torque pulsations. In an embodiment, the coupled vibration suppression algorithm for the permanent magnet direct drive system is embodied as the extended state observer integrated with the quasi-resonant controller, namely the QRC-ESO.

In another embodiment, a method for suppressing electromechanical coupling resonance is involved, and as shown in FIG. 1, includes:

determining a mechanical system structure and control system algorithm of an electromechanical device, and construct a dynamic model of a mechanical system and a control algorithm model of a control system.

In an embodiment, the electromechanical device includes a permanent magnet direct drive traction system, such as a permanent magnet direct drive train, a rotorcraft, and a wind turbine in a wind power plant.

Modeling methods for different electromechanical devices include: Dynamic modeling of locomotive with direct drive traction system considering electromechanical coupling effect, involving modeling direct drive trains; Research on Electromechanical Coupling Characteristics and Active Vibration Control of Large-Scale Wind Turbine Drivetrains by Zhang Shijie, involving modeling wind turbines; and Research on Electromechanical Coupled Vibration Characteristics of Traction Drive Systems Considering Inverter Harmonic Coupling by Ge Xinglai, involving modeling conventional trains. The enumeration here is not exhaustive. Specific references are as follows:

[1] Zirui Ye, Zaigang Chen, et al. "Dynamic modeling of locomotive with direct drive traction system considering electromechanical coupling effect [J]" Vehicle System Dynamics International Journal of Vehicle Mechanics and Mobility, 2023.

[2] Zhang Shijie. "Research on Electromechanical Coupling Characteristics and Active Vibration Control of Large-Scale Wind Turbine Drivetrains [D]" Chongqing: Chongqing University, 2022.

[3] Ge Xinglai, Chang Yu, et al. "Research on Electromechanical Coupled Vibration Characteristics of Traction Drive Systems Considering Inverter Harmonic Coupling [J]" Electric Machines and Control, 2024, 28(6): 110-118.

Constructing an electromechanical coupling model based on the dynamic model of the mechanical system and the control algorithm model of the control system: exchanging information between the dynamic model and a motor control model, the control algorithm model taking rotational velocity of a motor rotor and load signals of the motor rotor in the dynamic model as input signals for processing via the controller to output a motor control signal, the motor control signal driving an inverter to adjust a motor rotational velocity and a output drive torque, and the dynamic model calculating a dynamic response characteristic of the dynamic model based on a driving torque of a motor and a load torque of the motor.

Carrying out resonance characteristic analysis of an electromechanical system based on the electromechanical coupling model to determine resonance points: conducting modal analysis for the dynamic model of the mechanical system to obtain natural modal frequency information of drive components; analyzing a harmonic characteristic of a stator current and a harmonic characteristic of an output torque in the control algorithm to obtain a frequency distribution characteristic of a harmonic current and a frequency distribution characteristic of a harmonic torque, and performing comparative analysis on a mechanical modal frequency characteristic with a harmonic torque characteristic to determine a frequency distribution range of coupled vibrations of the electromechanical system and obtain the resonance points.

In another embodiment, a process of constructing the dynamic model of the mechanical system includes: determining components of the mechanical system, modeling drive components involved in drive as flexible bodies, to reflect a natural mechanical modal characteristic and a characteristic frequency, treating remaining components as rigid bodies to establish a finite element model of the mechanical system; discretizing the finite element model; by using a substructure modal reduction method, reducing a degree of freedom of the finite element model to create the flexible bodies and ensure that each component can transmit high-frequency vibrations.

A process of constructing the control algorithm model of the control system includes: determining a mathematical model of a control object in the control system, comprising a mathematical model of a permanent magnet motor and an inverter, and designing a motor controller for the mathematical model, where the motor controller includes an Active Disturbance Rejection (ADRC) rotational velocity loop controller, a dq-axis current controller, and a Pulse Width Modulation (PWM) modulation algorithm.

In the present disclosure, characteristics of both the mechanical model and an electrical model are taken into account. Coupled modeling is performed on the mechanical model and the electrical model, revealing the problem of electromechanical coupled vibrations. Existing modeling is predominantly either single mechanical modeling or single electrical modeling. In a single mechanical model, the motor torque is equivalent to a constant torque, neglecting the influence of a motor harmonic torque. In the single electrical modeling, the mechanical model is equivalent to a load mass, considering only the effects of mass and inertia while disregarding the modal frequency inherent in the mechanical structure itself. Consequently, existing models rarely consider the impact of the coupling characteristics between the two.

In another embodiment, the method further includes: designing a coupled vibration suppression algorithm for resonance points. Since a resonance source in the electromechanical system is the motor harmonic torque, it is necessary to design an observer for a coupled vibration state of the electromechanical system. To observe harmonic torques and rotational velocity fluctuations within a frequency range and output suppression signals to reduce the amplitude of the harmonic torques near the resonant frequency, thereby reducing the impact of harmonic torques on mechanical system vibrations.

In another embodiment, when the electromechanical device is a permanent magnet direct drive train, the step of constructing a dynamic model of a mechanical system includes: constructing a dynamic model of the entire train, and modeling a direct drive bogie dynamic model. The step of constructing a control algorithm model of a control system includes constructing a full-velocity-range control algorithm model for a permanent magnet direct drive motor. The step of constructing an electromechanical coupling model includes using an electromagnetic torque and a rotor rotational velocity as key parameters for electromechanical coupling of the permanent magnet direct drive system, building an electromechanical coupling dynamic numerical simulation platform based on the joint simulation of the dynamic model and the control algorithm model, and based on that, carrying out modal analysis of the entire train electromechanical system to study features of electromechanical coupling resonance and corresponding coupled vibration suppression algorithms.

In another embodiment, the mechanical system includes: a vehicle body, a bogie frame, permanent magnet direct drive traction systems, an inboard axle box and wheelsets.

All components except the permanent magnet direct drive traction systems can be regarded as rigid bodies. Each wheelset is driven by one permanent magnet direct drive traction system, and each permanent magnet direct drive traction system is composed of a permanent magnet direct drive traction motor, a flexible-plate hollow-shaft coupling, and a motor hanger.

In the present disclosure, a direct drive train motor is directly connected to wheels through a hollow shaft, with a drive ratio of 1:1. A harmonic torque of the motor acts directly on the mechanical system, and an output torque of the direct drive motor is greater than that of an asynchronous motor in a conventional traction system, resulting in a significant electromechanical coupling effect. However, in an existing train mechanical system, a motor is connected to wheels through a gearbox, with a drive ratio of approximately 3.6:1, and the gearbox serves to reduce velocities and increase torques. Therefore, in the existing system, the motor harmonic frequency is higher, far from the modal frequency of the mechanical system, and the electromechanical coupling effect is not prominent.

The step of constructing a dynamic model of the entire train includes: transmitting a load on the frame to the wheelsets through a primary suspension, connecting the vehicle body to the frame through a secondary suspension, and treating the primary suspension and the secondary suspension as spring-damper units; fixing a permanent direct drive motor stator to the motor hanger, and connecting the motor hanger with the frame through a suspension rod and a cantilever, where suspension points of the suspension rod at two ends of the motor primarily provide vertical force, while the cantilever can be regarded as a longitudinal and vertical spring-damper unit; and making axle box pull rods between the wheelsets and the frame, as well as traction rods between the bogie and the vehicle body equivalent to shock absorbers, and transmitting traction force of the bogie to the vehicle body through the traction rods.

A creep force model is adopted for wheel-rail contact, and Hertzian nonlinear contact is selected in a normal direction.

The step of modeling a direct drive bogie dynamic model includes: connecting a force-transmitting flange at one end of the hollow shaft coupling to an output end of the motor rotor by a flexible plate, the flexible plate is regarded as a spring-damper unit in longitudinal, vertical, and torsional directions, connecting the other end of the hollow shaft coupling to a force-transmitting disk by the flexible plate, assembling the force-transmitting disk and an axle through interference fit, taking the flexible plate between the hollow shaft and the force-transmitting disk equivalent to a spring-damper unit in the longitudinal, vertical, and torsional directions, and fixedly connecting the force-transmitting disk in the coupling and the axle, which synchronously rotate around a Y-axis of a coordinate system.

An axle box body is fixed to the axle through bearings, with only a degree of freedom for rotation around the Y-axis released between the axle box and the axle. The motor rotor is fixed to a stator housing through bearings at two ends, with only the degree of freedom for rotation around the Y-axis released between the rotor and the stator.

Additionally, full-degree-of-freedom and reduced-degree-of-freedom modal analysis is carried out for the wheelsets, the axle box, the frame, and the drive hollow shaft. Results indicate that the discrepancy in the modal frequency of the flexible bodies, when compared to that of an original model, does not exceed 5%, demonstrating good engineering applicability.

The full-velocity-range control algorithm model for the permanent magnet direct drive motor is constructed in Matlab/Simulink.

In another embodiment, the electromagnetic torque and the rotor rotational velocity are used as key parameters for electromechanical coupling of the permanent magnet direct drive system. Based on that, an electromechanical coupling dynamic numerical simulation platform based on the joint simulation of SIMPACK and SIMULINK is constructed. The platform calculates a real-time rotational velocity of the motor rotor in the dynamic model based on a traction torque and a load torque, and inputs the real-time rotational velocity into a traction motor control model. The motor control model adjusts the electromagnetic torque output by the motor based on a difference between an actual rotational velocity and a reference rotational velocity, thereby achieving operational control of the train. In the dynamic model, a rail spectrum, suspension components, structural elastic vibrations, etc. affect the rotational velocity of the motor rotor. The rotational velocity, as an input to the traction motor control system, in turn influences the electromagnetic torque output by the motor. The electromagnetic torque and the harmonic torque affect the dynamic response of the train mechanical structure, thereby realizing the coupling effect between the mechanical system and the control system.

Based on electromechanical coupling modeling, modal analysis of the entire train electromechanical system is carried out to study the features of electromechanical coupling resonance frequencies.

In this embodiment, within a commonly used velocity range (160 km/h to 200 km/h), considering conditions of new wheels (with a diameter of 860 mm) and worn wheels (with a diameter of 790 mm), a frequency band of a motor pulsating torque is concentrated between 790 Hz and 1182 Hz. Meanwhile, considering variation of coupling stiffness, the modal frequency of a torsional rigid body of the hollow shaft is 582 Hz~1132 Hz. The breathing modal frequencies of the hollow shaft are 785 Hz and 833 Hz. The first-order vertical bending modal frequency of the hollow shaft is 1130 Hz~1270 Hz, and the torsional elastic modal frequency of the hollow shaft is 1167 Hz~1711 Hz. The analysis reveals a high degree of overlap between the motor torque pulsation frequency band and a torsional rigid-body modal frequency band of the hollow shaft coupling. Therefore, within the commonly used velocity range, the motor torque pulsation will cause coupled vibrations of the hollow shaft coupling.

In an embodiment, within the commonly used velocity range, the motor torque pulsation will cause the coupled vibrations of the hollow shaft coupling. To ensure the reliability and safety of the system operation, it is necessary to design a coupled vibration suppression algorithm for the permanent magnet direct drive system according to the electromechanical coupling resonance characteristic. The risk of the electromechanical coupled vibrations is reduced by suppressing the torque pulsations. In an embodiment, the coupled vibration suppression algorithm for the permanent magnet direct drive system is embodied as the extended state observer integrated with the quasi-resonant controller, namely the QRC-ESO.

Multi-condition simulation of the electromechanical coupling model is carried out to collect torque pulsation and mechanical system vibration signals near the resonance points of the electromechanical system. The QRC-ESO observes an electromechanical coupled vibration signal and feeds the electromechanical coupled vibration signal back to the velocity loop controller. By adjusting the current, torque pulsation compensation is performed, thereby suppressing the coupled vibrations of the electromechanical system.

In another embodiment, a motor drive system for suppressing electromechanical coupling resonance is involved. As shown in FIG. 9, an electromechanical coupling resonance suppression controller is adopted. The controller is arranged in a control system, and the control system is connected with a mechanical system.

In another embodiment, the control system is shown in FIG. 10, and includes a velocity loop controller, a field-weakening control module, a current loop Proportional-Integral (PI) controller, an SVM modulation module, and an inverter module. The velocity loop controller adopts a Resonance Suppression-Active Disturbance Rejection (RS-ADRC). A control principle of the control system is as follows:

when the rotational velocity of the motor is low, the required reference voltage $u_{s,ref}$ is within an inverter voltage output range. In this case, the field-weakening control module is inactive, and a dq-axis reference current is determined by a Maximum Torque Per Ampere (MTPA) module.

As the rotational velocity gradually increases, the required reference voltage $u_{s,ref}$ gradually exceeds the inverter voltage output range. In this case, the field-weakening control module is enabled, and the dq-axis reference current is determined by the field-weakening control module. A d-axis current increases in a negative direction to weaken a motor back electromotive force amplitude and broaden a motor operating velocity range.

The current loop PI controller adjusts a dq-axis reference voltage based on the dq-axis reference current and inputs the dq-axis reference voltage into the SVM modulation module.

The SVM modulation module processes and outputs an inverter switching signal to control an on-off time and a sequence of the inverter module. This, in turn, controls a three-phase winding current of the permanent magnet direct drive motor, thereby achieving the goal of adjusting the rotational velocity and the torque of the motor.

In an embodiment, the meanings of symbols in FIG. 10 are as follows: $w_{m,ref}$ denotes a motor reference rotational velocity, $$T_e^*$$

denotes a reference torque, $i_{d,ref}$ denotes a d-axis reference current, $i_{q,ref}$ denotes a q-axis reference current, $u_{s,ref}$ denotes a stator reference voltage, $i_d$ denotes an actual d-axis current, $i_q$ denotes an actual q-axis current, $$u_d^*$$

denotes a d-axis reference voltage, $$u_q^*$$

denotes a q-axis reference voltage, $\theta_e$ denotes an electrical angle of the reference voltage, and $u_{dc}$ denotes a direct-current link voltage.

In another embodiment, the mechanical system is shown in FIG. 12 (DOF in the FIG. 12 stands for "degree of freedom") includes: a vehicle body, a bogie frame, permanent magnet direct drive traction systems, an inboard axle box and wheelsets. All components except the permanent magnet direct drive traction systems may be regarded as rigid bodies. Each wheelset is driven by one permanent magnet direct drive traction system, and each permanent magnet direct drive traction system is composed of a permanent magnet direct drive traction motor, a flexible-plate hollow-shaft coupling, and a motor hanger.

The foregoing embodiments only show several specific implementations of the present disclosure, which are described in detail but should not be understood as limitations on the scope of protection of the present disclosure. It should be noted that several transformations and improvements may also be made by those of ordinary skill in the art without departing from the conception of the solutions of the present disclosure, which fall within the scope of protection of the present disclosure.

What is claimed is:

1. A controller for suppressing electromechanical coupling resonance, comprising an Extended State Observer (ESO) integrated with a Quasi-Resonant Controller (QRC), (QRC-ESO), the QRC-ESO, configured to observe harmonic torques and rotational velocity fluctuations within a frequency range, and output suppression signals to reduce an amplitude of the harmonic torques near a resonant frequency, to reduce the impact of harmonic torques on mechanical system vibrations, wherein a state-space equation of the QRC-ESO is as follows:

$$\begin{bmatrix} \dot{z}_1 \\ \dot{z}_2 \end{bmatrix} = \begin{bmatrix} 0 & 1 \\ 0 & 0 \end{bmatrix}\begin{bmatrix} z_1 \\ z_2 \end{bmatrix} + \begin{bmatrix} b_0 \\ 0 \end{bmatrix}u + \begin{bmatrix} \beta_1 \\ \beta_2(1 + G_{QRC}) \end{bmatrix}(x_1 - z_1)$$

in the state-space equation, $z_1$ denotes an estimated mechanical angular velocity, $z_2$ denotes an estimated lumped disturbance, $b_0 = 1/J_0$, $J_0$ denotes a nominal inertia value, $x_1 = \omega_m$, $\omega_m$ denotes a mechanical angular velocity, $x_2 = d_n$, $d_n$ denotes a lumped disturbance, $u = i_s$, $i_s$ denotes a stator current, and $\beta_1$ and $\beta_2$ are gains of an estimation loop; $G_{QRC}$ is the representation of QRC, which is as follows:

$$G_{QRC}(s) = \frac{2K_r w_c s}{s^2 + 2w_c s + w_r^2}$$

in the formula, $\omega_c$ denotes a cutoff frequency of the QRC controller, $\omega_r$ denotes a resonant frequency of a controlled object, and $K_r$ denotes a gain coefficient of the QRC controller;

an error state-space equation of the QRC-ESO is:

$$\begin{bmatrix} \dot{e}_1 \\ \dot{e}_2 \end{bmatrix} = \begin{bmatrix} \beta_1 & 1 \\ \beta_2(1 + G_{QRC}) & 0 \end{bmatrix}\begin{bmatrix} e_1 \\ e_2 \end{bmatrix} + \begin{bmatrix} 0 \\ -1 \end{bmatrix}\dot{d}_n$$

in the error state-space equation, $e_1$ denotes an angular velocity estimation error, $e_1 = z_1 - \omega_m$, $e_2$ denotes a disturbance estimation error, and $e_2 = z_2 - d_n$;

a transfer function between the angular velocity estimation error $e_1$ and a system disturbance $x_2$ in the QRC-ESO is:

$$G_{e1}^{QRC-ESO}(s) = \frac{e_1}{x_2} = \frac{s}{s^2 + \beta_1 s + \delta(s)}$$

in the formula, $\delta$ (s)$=\beta_2(1+G_{QRC}(s))$; and a transfer function between a disturbance estimation $z_2$ and the system disturbance $x_2$ in the QRC-ESO is:

$$G_{z2}^{QRC-ESO}(s) = \frac{z_2}{x_2} = \frac{\delta(s)}{s^2 + \beta_1 s + \delta(s)};$$

wherein the QRC-ESO is obtained using the following steps:

determining a mechanical system structure of an electromechanical device and a control system algorithm of the electromechanical device, and constructing a dynamic model of a mechanical system and a control algorithm model of a control system;

constructing an electromechanical coupling model based on the dynamic model of the mechanical system and the control algorithm model of the control system: exchanging information between the dynamic model and a motor control model, the control algorithm model taking rotational velocity of a motor rotor and load signals of the motor rotor in the dynamic model as input signals for processing via a controller to output a motor control signal, the motor control signal driving an inverter to adjust a motor rotational velocity and an output drive torque, and the dynamic model calculating a dynamic response characteristic of the dynamic model based on a driving torque of a motor and a load torque of the motor;

carrying out resonance characteristic analysis of an electromechanical system based on the electromechanical coupling model to determine resonance points: conducting modal analysis for the dynamic model of the mechanical system to obtain natural modal frequency information of drive components, analyzing a harmonic characteristic of a stator current and a harmonic characteristic of an output torque in the control algorithm to obtain a frequency distribution characteristic of a harmonic current and a frequency distribution characteristic of a harmonic torque, and performing comparative analysis on a mechanical modal frequency characteristic with a harmonic torque characteristic to determine a frequency distribution range of coupled vibrations of the electromechanical system and obtain the resonance points;

designing a coupled vibration suppression algorithm for the resonance points; and designing an observer for a coupled vibration state of the electromechanical system based on that a resonance source in the electromechanical system is a motor harmonic torque.

2. The controller for suppressing electromechanical coupling resonance as claimed in claim 1, wherein the cutoff frequency of the QRC controller is $[\omega_r - \alpha, \omega_r + \alpha]$, a value of $\alpha$ is within [10, 25] with a unit of Hz, and the gain coefficient of the QRC controller is [0.0001, 0.001].

3. The controller for suppressing electromechanical coupling resonance as claimed in claim 1, comprising a Resonance Suppression-Active Disturbance Rejection (RS-ADRC), wherein the RS-ADRC adopts the QRC-ESO as an extended state observer, and an open-loop transfer function of the RS-ADRC is:

$$C_0(s) = \frac{[(2K_s w_0 + w_0^2)s + K_s w_0^2]\Delta(s) + K_r w_c(s^2 + K_s s)}{[s^3 + (2w_0 + K_s)s^2]\Delta(s)}$$

17

18 in the open-loop transfer function, $\omega_c$ denotes the cutoff frequency of a QRC controller, $\omega_r$ denotes a resonant frequency of a controlled object, $K_r$ denotes a gain coefficient of the QRC controller, $\omega_0$ denotes a bandwidth of a sensor, and $K_s$ denotes a velocity loop gain parameter; and $$\Delta(s) = s^2 + 2w_c s + w_r^2.$$

4. A method for suppressing electromechanical coupling resonance, comprising:

determining a mechanical system structure of an electromechanical device and a control system algorithm of the electromechanical device, and constructing a dynamic model of a mechanical system and a control algorithm model of a control system;

constructing an electromechanical coupling model based on the dynamic model of the mechanical system and the control algorithm model of the control system: exchanging information between the dynamic model and a motor control model, the control algorithm model taking rotational velocity of a motor rotor and load signals of the motor rotor in the dynamic model as input signals for processing via a controller to output a motor control signal, the motor control signal driving an inverter to adjust a motor rotational velocity and a output drive torque, and the dynamic model calculating a dynamic response characteristic of the dynamic model based on a driving torque of a motor and a load torque of the motor; and carrying out resonance characteristic analysis of an electromechanical system based on the electromechanical coupling model to determine resonance points: conducting modal analysis for the dynamic model of the mechanical system to obtain natural modal frequency information of drive components; analyzing a harmonic characteristic of a stator current and a harmonic characteristic of an output torque in the control algorithm to obtain a frequency distribution characteristic of a harmonic current and a frequency distribution characteristic of a harmonic torque, and performing comparative analysis on a mechanical modal frequency characteristic with a harmonic torque characteristic to determine a frequency distribution range of coupled vibrations of the electromechanical system and obtain the resonance points;

designing a coupled vibration suppression algorithm for the resonance points;

designing an observer for a coupled vibration state of the electromechanical system based on a resonance source in the electromechanical system is a motor harmonic torque;

observing harmonic torques and rotational velocity fluctuations within a frequency range, and outputting suppression signals to reduce an amplitude of the harmonic torques near a resonant frequency, to reduce the impact of harmonic torques on mechanical system vibrations;

the observer for the coupled vibration state of the electromechanical system is an Extended State Observer (ESO) integrated with a Quasi-Resonant Controller (QRC), a state-space equation is as follows:

$$\begin{bmatrix} \dot{z}_1 \\ \dot{z}_2 \end{bmatrix} = \begin{bmatrix} 0 & 1 \\ 0 & 0 \end{bmatrix}\begin{bmatrix} z_1 \\ z_2 \end{bmatrix} + \begin{bmatrix} b_0 \\ 0 \end{bmatrix}u + \begin{bmatrix} \beta_1 \\ \beta_2(1 + G_{QRC}) \end{bmatrix}(x_1 - z_1)$$

in the state-space equation, $z_1$ denotes an estimated mechanical angular velocity, $z_2$ denotes an estimated lumped disturbance, $b_0 = 1/J_0$, $J_0$ denotes a nominal inertia value, $x_1 = \omega_m$, $\omega_m$ denotes a mechanical angular velocity, $x_2 = d_n$, $d_n$ denotes a lumped disturbance, $u = i_s$, $i_s$ denotes a stator current, and $\beta_1$ and $\beta_2$ are gains of an estimation loop; $G_{QRC}$ is the representation of QRC, which is as follows:

$$G_{QRC}(s) = \frac{2K_r w_c s}{s^2 + 2w_c s + w_r^2}$$

in the formula, $\omega_c$ denotes a cutoff frequency of the QRC controller, $\omega_r$ denotes a resonant frequency of a controlled object, and $K_r$ denotes a gain coefficient of the QRC controller.

5. The method for suppressing electromechanical coupling resonance as claimed in claim 4, wherein constructing the dynamic model of the mechanical system comprises:

determining components of the mechanical system, modeling drive components involved in drive as flexible bodies, to reflect a natural mechanical modal characteristic and a characteristic frequency, treating remaining components as rigid bodies to establish a finite element model of the mechanical system;

discretizing the finite element model; by using a substructure modal reduction method, reducing a degree of freedom of the finite element model to create the flexible bodies and ensure that each component can transmit high-frequency vibrations; and a process of constructing the control algorithm model of the control system comprises: determining a mathematical model of a control object in the control system, comprising a permanent magnet motor and an inverter, and designing a motor controller for the mathematical model, wherein the motor controller comprises an Active Disturbance Rejection (ADRC) rotational velocity loop controller, a dq-axis current controller, and a Pulse Width Modulation (PWM) modulation algorithm.

6. The method for suppressing electromechanical coupling resonance as claimed in claim 4, wherein when the electromechanical device is a permanent magnet direct drive train, the step of constructing a dynamic model of a mechanical system comprises:

constructing a dynamic model of the entire train, and modeling a direct drive bogie dynamic model;

wherein constructing a control algorithm model of a control system comprises: constructing a full-velocity-range control algorithm model for a permanent magnet direct drive motor;

wherein constructing an electromechanical coupling model comprises:

using an electromagnetic torque and a rotor rotational velocity as key parameters for electromechanical coupling of the permanent magnet direct drive system;

building an electromechanical coupling dynamic numerical simulation platform based on the joint simulation of the dynamic model and the control algorithm model, and based on that, carrying out modal analysis of the entire train electromechanical system to study features of electromechanical coupling resonance and corresponding coupled vibration suppression algorithms.

7. The method for suppressing electromechanical coupling resonance as claimed in claim 6, wherein the mechanical system comprises: a vehicle body, a bogie frame, permanent magnet direct drive traction systems, an inboard axle box and wheelsets, all components except the permanent magnet direct drive traction systems can be regarded as rigid bodies, each wheelset is driven by one permanent magnet direct drive traction system, and each permanent magnet direct drive traction system is composed of a permanent magnet direct drive traction motor, a flexible-plate hollow-shaft coupling, and a motor hanger.

8. The method for suppressing electromechanical coupling resonance as claimed in claim 6, wherein an electromechanical coupling principle of the electromechanical coupling dynamic numerical simulation platform is as follows: the electromechanical coupling dynamic numerical simulation platform calculates a real-time rotational velocity of the motor rotor in the dynamic model based on a traction torque and a load torque, and inputs the real-time rotational velocity into the control algorithm model, and the control algorithm model adjusts the electromagnetic torque output by the motor based on a difference between an actual rotational velocity and a reference rotational velocity, to achieve operational control of the train;

wherein coupled parameters of the dynamic model influence the rotational velocity of the motor rotor, the rotational velocity, as an input to a traction motor control system, in turn influences the electromagnetic torque output by the motor, the electromagnetic torque and the harmonic torque affect the dynamic response of a train mechanical structure, to implement a coupling effect between the mechanical system and the control system, and the coupled parameters comprise a rail spectrum, suspension components, and structural elastic vibrations.

9. A motor drive system for suppressing electromechanical coupling resonance, wherein a controller for suppressing electromechanical coupling resonance suppression controller according to claim 1 is adopted, the controller is arranged in a control system, and the control system is connected with a mechanical system.

\* \* \* \* \*